Dec. 6, 1955     R. J. STAVA ET AL     2,726,337
CASSETTE
Filed April 22, 1953     2 Sheets-Sheet 1
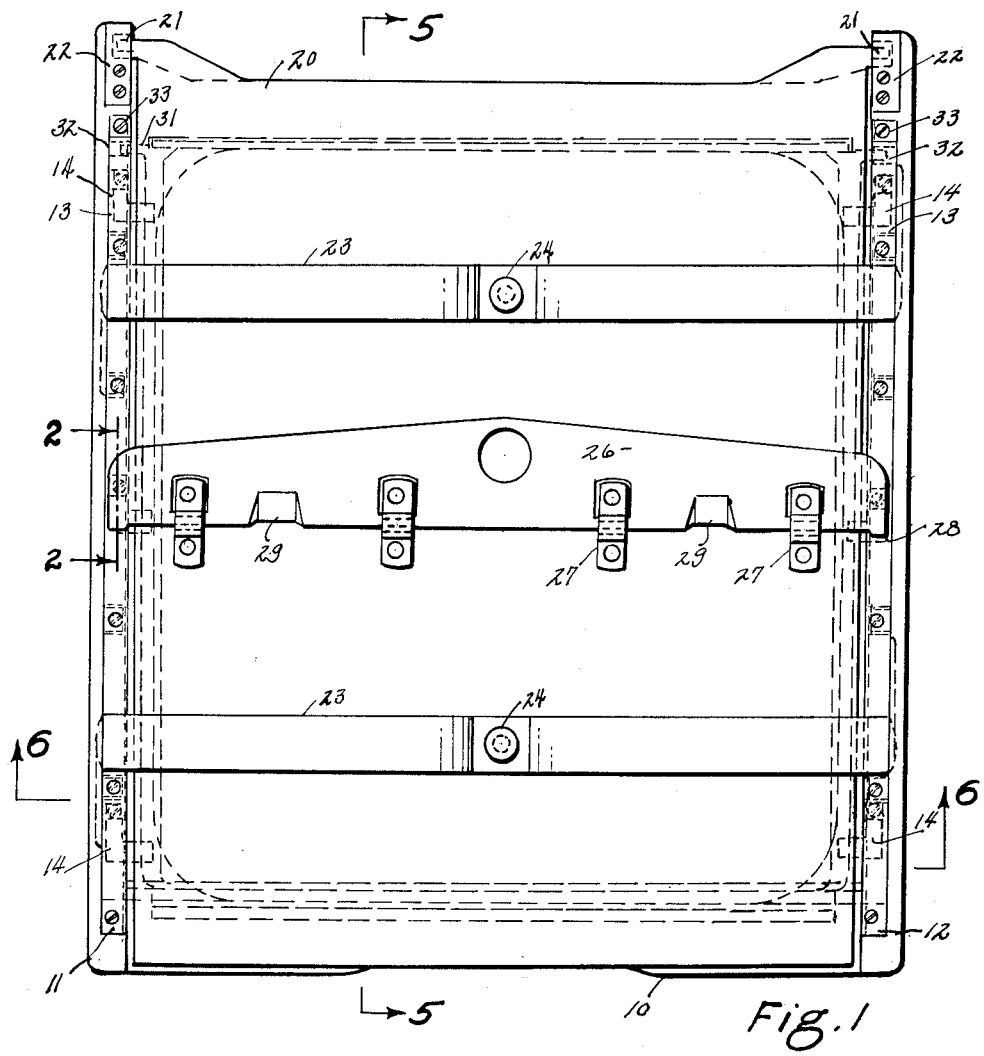
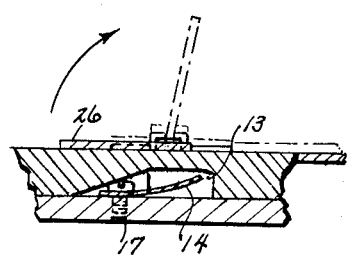
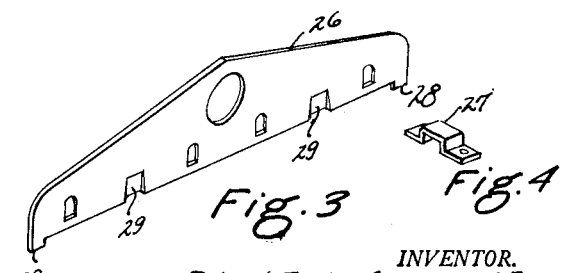
INVENTOR.
Robert J. Stava and David M. Barrett
BY Bates, Teare & McBean
Attorneys Dec. 6, 1955   R. J. STAVA ET AL   2,726,337
CASSETTE
Filed April 22, 1953   2 Sheets-Sheet 2
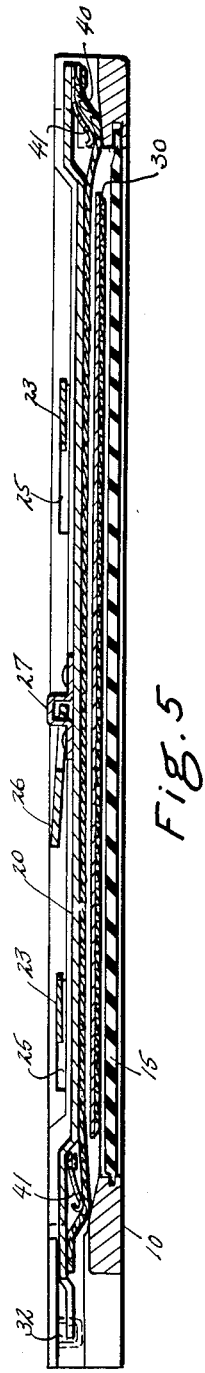
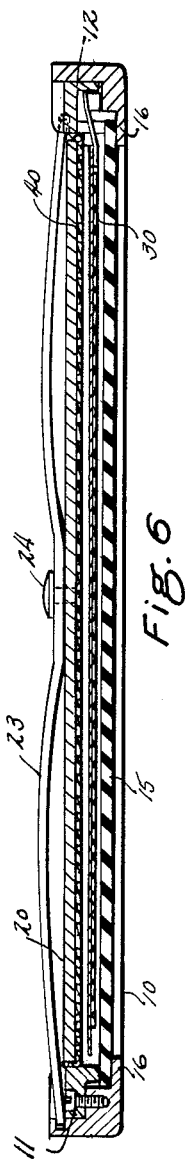
INVENTOR.
Robert J. Stava and David M. Barrett
BY Bates, Teare & McBean
Attorneys

United States Patent Office 2,726,337
Patented Dec. 6, 1955

2,726,337

CASSETTE

Robert J. Stava, University Heights, and David M. Barrett, Lyndhurst, Ohio, assignors to Picker X-Ray Corporation, Waite Mfg. Div. Inc., Cleveland, Ohio, a corporation of Ohio Application April 22, 1953, Serial No. 350,461

10 Claims. (Cl. 250—68)

The invention relates to X-ray apparatus generally and more particularly to a cassette for accommodating film in the radiographic performance of X-ray apparatus.

Radiographic X-ray procedure contemplates the support and positioning of a film for exposure to X-ray radiations. The support or film holder is commonly termed a cassette which may be removably mounted in a carriage for positioning with respect to the X-ray radiations.

A method of making prints on a photo-sensitive medium when subjected to light rays has been developed and is known as the "Polaroid" method. The film is embodied in a packet having a light-proofed photosensitive surface, a print receiving surface, and a self-contained developing medium conditioned for processing release after exposure. It is a principal object of this invention to provide a cassette to accommodate such a film packet in a manner that will adapt it to radiographic procedure in a conventional X-ray apparatus. Another object is the provision of a cassette construction which will aid in the processing of a film packet of this type.

Briefly, in accordance with this invention, the cassette embodies a shallow film supporting receptacle open at the ends and carrying an intensifying screen. The receptacle also has a cover which may be clamped against the contents and which carries an externally accessible lever for separating the cover from contents while in clamped position sufficiently to permit removal of selected portions of the film packet from the open ends of the receptacle for exposure and processing.

In the drawings:

Fig. 1 is a top plan view of the cassette film holder;

Fig. 2 is a partial sectional view taken along the lines 2—2 in Fig. 1;

Fig. 3 is a perspective view of the elevating lever carried by the cassette cover;

Fig. 4 is a perspective view of a bridle clamp for mounting the elevating lever to the closure;

Fig. 5 is a view taken along the lines 5—5 in Fig. 1;

Fig. 6 is a view taken along the lines 6—6 in Fig. 1;

Fig. 7 is a diagrammatic view illustrating the disposition of the film packet in the cassette.

Referring now to Figs. 1, 5 and 6, there is shown a cassette having a substantially rectangular frame base 10 with a cover 20 hinged at one end. The base 10 has raised marginal edges along two parallel sides which carry retainer strips 11 and 12 to define a shallow film receiving receptacle which is open at each end between the retainer strips. Each retainer strip has hollow portions 13 spaced along its length for accommodating leaf springs which project through openings into the receptacle area to resiliently support an intensifying screen 30 in a manner to be hereinafter more fully described.

The bottom of the film receptacle is closed by a panel 15 through which the X-ray exposure is made. The panel 15 is preferably constructed of Bakelite material and may be secured in any suitable manner to an internal flange 16 on the cassette frame as best shown in Figs. 5 and 6 of the drawings.

The intensifying screen 30 for converting the transmitted X-rays into useful image producing rays is mounted on an aluminum sheet which is loosely hinged at one end of the cassette frame for disposition into the film receptacle and is of a size sufficient to overlie the exposure area defined by the panel 15. The loose hinge is preferably in the form of a pivot arrangement wherein the hinged end of the screen 30 is provided with laterally extending tongues 31 which are loosely seated in enlarged openings 32 formed in the retainer strips 11 and 12 at each side of the cassette frame. The loose pivotal connection enables the screen 30 to be raised or lowered in a horizontal plane relative to the panel 15 as well as permitting pivotal rotation of the screen into and out of the film receptacle. When the screen is pivoted into the receptacle area of the cassette frame it is supported by the spaced leaf springs 14 which extend into the receptacle area from the retainer strips. As best shown in Fig. 2, each leaf spring 14 is secured at one end by suitable means 17 to the base of the cassette frame and coacts therewith to resiliently support the screen in spaced vertical relation with respect to the panel 15.

The cover 20 is also provided at the hinged end with laterally extending tongues 21 that are loosely pivoted in pivot brackets 22 at the same end of the cassette frame as the intensifying screen so that both the cover and the intensifying screen may be swung out of the film receptacle area for insertion of the film packet therein. The pivotal connection of the cover 20 to the cassette frame functions in the same manner as that of the intensifying screen to permit the cover to be raised or lowered in a horizontal plane relative to the panel and the intensifying screen.

Clamping members in the form of conventional pressure spring arms 23 are pivotally mounted on the back of the cover by suitable rivets 24 so that they may be rotated into position with their respective ends entering receiving slots 25 on the internal raised surface of each retainer strip. Thus, the pressure spring arms 23 may be manually rotated into engagement with such slots to apply and maintain pressure on the cover 20 in a direction to place the intensifying screen 30 in good contact with the photosensitive surface of the film packet in the film receptacle, the cover serving also as a pressure plate.

As best shown in Figs. 1, 3 and 4, an elevating lever 26 is pivoted through bridle brackets 27 to the back of the cover and extends transversely across the cover with its extremities overhanging the adjacent retainer strips 11 and 12 respectively. Each extremity of the elevating lever 26 is provided with a depending portion 28 which engages the corresponding retainer strip when the elevating lever is raised into vertical position and coacts through the bridle brackets 27 to elevate the cover in bridging relation between the retainer strips. Suitable indentations 29 are formed along the bottom edge of the elevating lever to restrain pivotal rotation of the lever beyond approximately 115° in the raised portion. Raising of the cover by means of the lever 26 provides a gap or space between the cover and the intensifying screen which in turn permits the leaf springs to elevate the intensifying screen from the panel to relieve the clamping pressure on the film packet and permit removal through the open ends of selected portions for exposure and processing in a manner to be hereinafter more fully described.

The cover 20 is covered, on its internal face, with a felt cushion 40 which overlies soft springs 41 at each end to deflect the cushion and form a light-tight withdrawal passage at each end of the cassette when the cover is closed, as best shown in Fig. 5.

Referring now to Fig. 7 of the drawings, the film packet includes a photo-sensitive surface 50 which may be a silver halide emulsion enclosed by a light-proof envelope 51 with a perforated rip end 52. A print receiving sheet 53 has glued about its perimeter a paper dam which is readily stripped. The print receiving sheet 53 and the enclosed photo-sensitive surface 50 are hinged together in overlapping relation at the rip end through the medium of the envelope and, sandwiched between the two, along the hinged line, are rupturable containers or pods 54 carrying a developing medium in the form of an imbibing jell.

In loading the cassette, the film packet is grasped at the perforated rip end 52 and the envelope 51 is inserted between the intensifying screen 30 and the panel 15 of the cassette, with the print receiving sheet 53 passing over the top of the intensifying screen. The packet is inserted in the receptacle of the cassette frame until the perforations on the rip tab end project as indicated on the packet. The cover 20 is then closed and the tab is severed from the black envelope at the perforated end of the packet, thus leaving a tab projecting slightly from the end of the packet and through the adjacent open end of the cassette. The cover 20 of the cassette is then raised by lifting the elevating lever 26, and the projecting end of the envelope is withdrawn through the opposite open end of the cassette to uncover the sensitive surface. Thereafter, the elevating lever 26 is dropped to its inactive position (Fig. 5) returning pressure to the intensifying screen 30 and the film packet. The cassette is then in condition for radiographic exposure of the film packet.

Thus, we have provided a cassette which will accommodate a film packet of the type described and which is of a construction that it can be used in a cassette tray of conventional X-ray apparatus. The cassette is constructed for efficient loading and conditioning of the self-contained film packet for radiographic exposure and processing.

We have shown and described what we consider to be the preferred embodiments of our invention, along with suggestions of modified forms, and it will be obvious to those skilled in the art that other changes and modifications can be made without departing from the scope of our invention, as defined by the appended claims.

We claim:

1. A cassette for holding a film packet comprising, a receptacle for enclosing the packet in light-tight relation and having means permitting exposure of the packet to X-rays, and means forming a light-tight withdrawal passage from the receptacle, said means including a flexible boundary portion coacting to resiliently bias said withdrawal passage in light-tight closed condition while permitting withdrawal of selected portions of the packet for exposure and processing.

2. A cassette for holding a photo-sensitive element enclosed in a light-tight container and a print receiving element in condition for exposure to X-rays comprising, a receptacle having an intensifying screen adapted to receive the container with the photo-sensitive element on one side of the screen and the print receiving element on the other side of the screen and to enclose them in light-tight relation for exposure to X-rays, means for applying pressure against the contents of the receptacle to place the screen in good contact with the photo-sensitive element, said receptacle having a light-tight withdrawal passage for withdrawal of the container and of the photo-sensitive and print receiving elements for exposure and processing respectively, and other means for relieving the pressure against the contents to permit withdrawal of the container and elements after the pressure is applied.

3. A cassette comprising, a base forming a film receptacle, a cover pivoted at one end of the base and adapted to overlie the receptacle area, means for clamping the cover against the contents in the receptacle, and other means coacting between the cover and the base to relieve the clamping pressure on the contents while holding the cover closed.

4. A cassette comprising in combination, a base forming a film receptacle, an intensifying screen pivoted at one end thereof for positioning into and out of the film receptacle, a cover for the receptacle pivoted at one end of the base, means for clamping the cover against the intensifying screen and the contents in the receptacle, and other means for releasing the clamping pressure on the contents while holding the cover closed.

5. A cassette comprising, a base forming a film receptacle, a cover therefor, a pivotal connection between one end of the cover and the base including means for permitting the cover and connection to be raised and lowered in a common plane relative to the base, means for clamping the cover against the contents in the receptacle, and other means coacting between the cover and the base to raise the cover against the clamping force and relieve the pressure on the contents of the receptacle.

6. A cassette comprising, a rectangular frame having upstanding marginal edges along two opposite and parallel sides forming a shallow receptacle open between the upstanding edges at opposite ends thereof, a cover for the receptacle having a loose pivotal connection at one end in the upstanding marginal edges of the base which permits raising or lowering the cover vertically as a unit relative to the base, means for clamping the cover against the contents in the receptacle, and other means adapted to coact between the cover and the upstanding marginal edges to raise the cover against the clamping force and relieve the pressure on the contents of the receptacle.

7. The cassette of claim 6, wherein the pressure relieving means includes an elevating lever extending transversely across the cover with its extremities overlying the raised marginal edges of the frame base, and means pivotally coupling the elevating lever to the external face of the cover to permit the lever to be raised into bridging relation across the cassette frame for coaction therewith to lift the cover away from the contents of the film receptacle.

8. A cassette comprising a base for supporting film, a cover therefor, a pivotal connection between one end of the cover and base including means for permitting the cover and connection to be raised and lowered a limited distance as a unit parallel to the plane of the base, means for clamping the cover against the film and the base, other means adapted to coact between the cover and the base to raise the cover against the clamping force and relieve the pressure on the film to permit its withdrawal from the base, and a light-tight enclosure for the film including springs at the marginal edges of the inner face of the cover and a felt cushion on the inner face overlying said springs and adapted to be urged by them into light-tight engagement against the adjacent portion of the base when the cover is closed.

9. In a cassette having a shallow film receptacle with a cover therefor, means adapted to coact between the cover and receptacle to clamp the cover against the contents of the receptacle, a member extending transversely across the cover and pivoted thereto for positioning into and out of the plane of the cover, said member having means at a transverse extremity adapted to coact in one position with the receptacle to place the member in bridging relation across the receptacle and thereby lift the cover against the clamping force away from the contents in the receptacle.

10. A cassette comprising, a base having raised boundary portions forming a shallow film receptacle, a cover adapted to be disposed in light-tight relation over the contents within the receptacle, means for clamping the cover against the contents of the receptacle, a lever extending transversely across the cover and overhanging the raised boundary portions of the base at its extremities, a connection between the lever and the cover adapted to permit the cover to be positioned into and out of the plane of the cover, means at the overhanging extremities of the lever adapted to coact with the raised boundary portions of the base as the lever is positioned out the plane of the cover to lift the cover against the clamping force and away from the contents of the receptacle, and means forming a light-tight film withdrawal passage between the cover and the base when the cover is raised to permit withdrawal of a selected portion of the contents for exposure of the remainder in the receptacle.

References Cited in the file of this patent

UNITED STATES PATENTS

| | | |
|---|---|---|
| 2,371,843 | Powers | Mar. 20, 1945 |
| 2,505,562 | Meschan | Apr. 25, 1950 |
| 2,565,378 | Land | Aug. 21, 1951 |
| 2,600,064 | McCune | June 10, 1952 |